Dec. 6, 1966 J. F. MAYER 3,290,047
RELIEF SEAL WITH DUAL SEALING SURFACES
Filed Feb. 11, 1963 2 Sheets-Sheet 1

INVENTOR.
JOHN F. MAYER
BY
*Donald W. Graves*
ATTORNEY

Dec. 6, 1966 J. F. MAYER 3,290,047
RELIEF SEAL WITH DUAL SEALING SURFACES
Filed Feb. 11, 1963 2 Sheets-Sheet 2

INVENTOR.
JOHN F. MAYER
BY
Donald W. Graves
ATTORNEY

United States Patent Office 3,290,047
Patented Dec. 6, 1966

3,290,047
RELIEF SEAL WITH DUAL SEALING SURFACES
John F. Mayer, Woodland Hills, Calif., assignor to
North American Aviation, Inc.
Filed Feb. 11, 1963, Ser. No. 257,588
4 Claims. (Cl. 277—2)

This invention relates to seals.

More particularly, this invention relates to annular seals for preventing leakage between two mating parts.

Specifically, the invention relates to annular seals for preventing leakage between two mating parts wherein the seals have primary and secondary sealing surfaces with means between the two surfaces for capturing leakage past the primary surface, so as to obviate leakage past the secondary surface.

With the increasing use of missiles and rocket engines and the attendant high pressure and temperatures encountered as well as extremely low temperatures, the need for effective seals between mating parts has become increasingly important. This is a particular problem when two or more propellants are used in a single rocket engine which makes it extremely dangerous if any possibility of contact between two propellants is possible before reaching the combustion chamber. However, even in conventional ducts for transporting propellants, toxic or corrosive fluids, should there be any leakage, personnel in the vicinity of such duct may be endangered.

Many seals for alleviating these problems have been suggested in the prior art. However, many of these seals, while performing satisfactorily are either prohibitively expensive, complex, or too heavy for applications in missiles. An effective seal is disclosed in United States Patent No. 3,083,023 assigned to the assignee of this invention. This seal is an improvement over the seal disclosed in that application. More particularly, this seal provides a primary surface and a secondary sealing surface with means between the two surfaces to capture leakage past the primary surface and remove same if desired. This is particularly advantageous should, for any reason, the primary seal fail. In addition, this seal not only provides for removing leakage past the primary seal, but allows a monitoring operation in that by providing a plurality of tap-off ports, one for each seal, an observer can determine immediately which primary seal or seals is leaking. Also, by the use of this seal a pre-determined torque can be applied to the bolts or other devices which hold the mating parts together so that a constant circumferential stress is applied to the seals to maintain correct design stresses. Also, by providing a secondary sealing surface on a rigid member forming part of the seal, closer tolerances can be maintained and dimensions fixed. This secondary seal by being on a rigid portion allows a greater sealing pressure. Other advantages of the instant seal will become apparent as this description proceeds.

Accordingly, it is an object of this invention to provide a new and improved seal.

It is another object of this invention to provide a new seal in which provision is made for capturing leakage past a primary seal thus assuring that no leakage occurs past the secondary seal.

It is another object of this invention to provide a new seal in which closer tolerances and dimensions may be maintained in the structural assembly in which the seal is installed.

Briefly, this new and improved seal comprises an annular ring base portion with flexible side walls extending therefrom, with the extremities of the side walls having primary sealing surfaces. A secondary sealing surface is provided on the ring base portion. Provision is made whereby a gas or fluid escaping past the primary seal on either side thereof is tapped off and ducted overboard or disposed of in some manner by providing free access between one side of the seal and the other. This allows the use of only one tap-off port per seal. The term annular is intended to include oval configuration as well as circuluar. Also within the scope of this invention are seals which are not curved but are straight.

Other advantages and objects of this invention will become apparent as this description proceeds when taken in conjunction with the accompanying drawings in which:

FIG. 7 is a plan view of a portion of another embodiment of this invention, while

Figure 1:
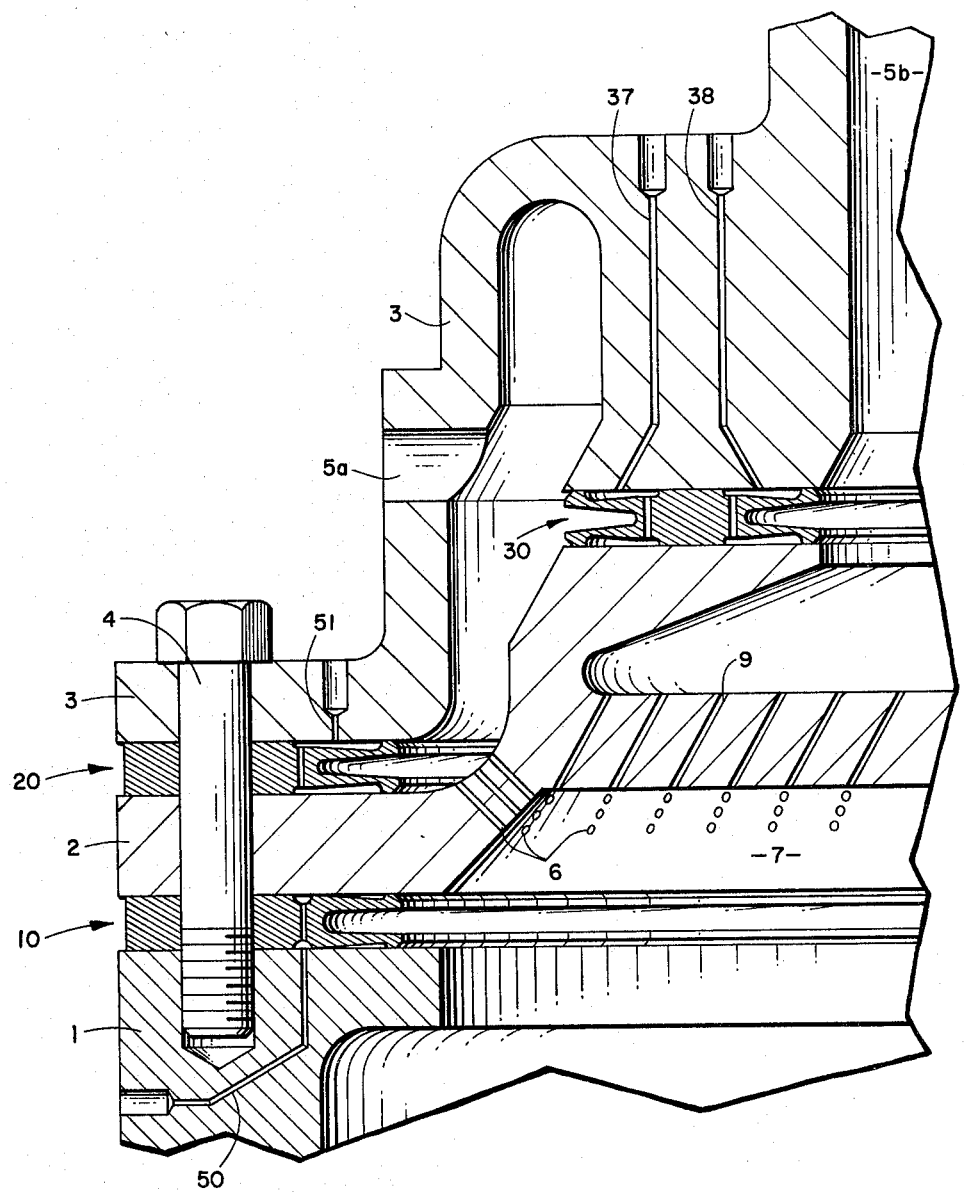
FIG. 1 is a cross-sectional view of one side of an injector and combustion chamber assembly of a rocket and illustrates various embodiments of the seal as installed.

Referring to FIG. 1, three embodiments of this invention are shown in different applications. A seal shown generally as 10 is shown as sealing two mating parts 1 and 2 which are parts of the combustion chamber assembly and the injector face, respectively, of the rocket engine. Another seal 20 is shown which seals part 2 and element 3, another portion of the rocket engine. A bolt 4 is shown for illustration only as holding parts 1, 2 and 3 together. A duct 5a allows the passage of fuel therethrough and through injector apertures 6 into combustion chamber 7. Oxidizer enters duct 5b and through apertures 9 into combustion chamber 7. The injector construction and combustion chamber is illustrated only as an example and does not form a part of this invention.

Figure 2:
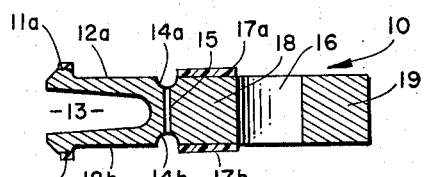
FIG. 2 is a detailed cross-sectional view of a portion of a seal of one embodiment of this invention.

Referring to FIG. 2, a portion of seal member 10 is shown in more detail. Seal 10 is annular in configuration and, as can be seen in FIG. 1, extends circumferentially about the combustion chamber 7. This seals between injector face 2 and structural part 1. This seal has primary sealing surfaces 11a and 11b. These sealing surfaces can be formed by very close machining, but preferably has a layer of softer material such as copper for high temperature applications or Teflon for cryogenic temperatures. Preferably, the Teflon is sprayed on in the form of a dispersion enamel although it may be in the form of a tape. When a copper layer is desired, it is plated on the seal to a greater than design thickness and then machined to the design thickness. These materials are given only as examples, it being understood that any sealing material which satisfactorily operates is within the scope of this invention. Flexible side walls are shown as 12a and 12b. Space 13 allows these side walls to flex toward each other. Preferably, these side walls taper as shown so that the side wall material is uniformly stressed. More particularly, the walls taper at a ratio of 2:1 (the ratio of the cross-sectional area at the ring base portion to the cross-sectional area at the leg or wall extremity). With such a taper, the stress due to flexure is uniform throughout the wall resulting in a minimum amount of material. Annular grooves 14a and 14b extend around the ring and 15 represents one aperture although there is preferably a plurality. These apertures connect the grooves and the purpose is to allow the passage of fluid from above side wall 12a to below side wall 12b. An aperture 16 is provided for the passage of a bolt 4 such as shown in FIG. 1 and 17a and 17b are secondary sealing surfaces. When ring 10 is assembled such as shown in FIG. 1, a high pressure occurs in combustion chamber 7 when rocket engine is firing due to combustion of fuel and oxidizer. To prevent leakage of this combusted fluid between parts 1 and 2, the seal operates as follows. The primary sealing surfaces 11a and 11b ordinarily stops all flow of fluid since the legs are flexed causing a pressure between the sealing surfaces 11a and 11b and their respective mating parts. This is a result of the torque applied to bolt 4 to draw the two parts together. Since the sealing surfaces 11a and 11b are out of the plane of surfaces 17a and 17b, it is evident that as the side walls are squeezed together, a certain pressure will be applied to the primary sealing surfaces. When the mating parts 1 and 2 are drawn together, the ring portion or member 18 and spacer portion 19 acts as a gage block preventing any further movement of parts 1 and 2 toward each other. This is an important advantage in that it allows the design stress on surfaces 11a and 11b and side walls 12a and 12b along with the distances between mating parts 1 and 2 to remain at the design level. In addition, the secondary seal can be subjected to greater pressures than is the case with flexible seals. Leakage past the primary surfaces results in fluid forming behind the primary seal. By providing the apertures 15, fluid may escape from either below the seal or above the seal through the apertures 15 and allowed to exit through port 50. This escaping fluid may either be ducted overboard or collected by some means not shown. In addition, a gas detection instrument or a pressure gage may be utilized to ascertain whether a leak has occurred past the primary seal. Thus, by using a pressure gage or gas detection apparatus on the tap-off port of each seal, it can be readily ascertained which seal has a primary seal leak. By using the secondary seal portion 17a and 17b (FIG. 2), no leakage will result past the secondary seal as the tap-off port 50 has removed the fluid. Thus, it can be seen that an effective seal occurs.

The seal shown in FIG. 2 has the further advantage in that a "spacer block" 19 is provided. This has several advantages. It assures that when the bolt is installed, the seal is properly aligned. In addition, if a high stress is applied to the bolt, bending of the parts is precluded since the mating parts will be in contact with the ring portion 18 and the spacer block 19 thus assuring adequate support. If only the ring portion 18 is provided, the left hand side of part 2, for example, could be distorted by use of the bolt whereas the spacer block obviates any such difficulty. Another advantage of this spacer block lies in the convenience provided in examining the seal after installation so that it can be readily determined that the proper sized seal is used. For example, the number of the seal can be placed on the outer peripheral portion thereof so as to be readily observable.

Figure 3:
FIG. 3 is a detailed cross-sectional view of another embodiment of this invention.

The seal shown in FIG. 3 is similar to that shown in FIG. 1. The only difference between the structure shown in FIG. 3 and that shown in FIG. 2 is the lack of a spacer block. This is particularly suitable when there is no room for a spacer block. In addition, it is a simpler ring.

Figure 4:
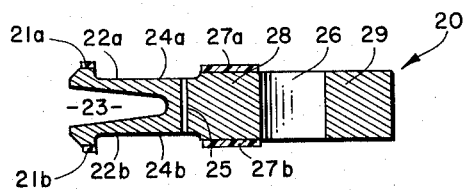
FIG. 4 is a detailed cross-sectional view of another embodiment of this invention viewed along the lines 4—4 of FIG. 8.

FIG. 4 is very similar to FIG. 2 and illustrates another embodiment of this invention. Thus, sealing surfaces 21a and 21b are shown along with side walls 22a and 22b. Again, a groove 23 is provided to allow flexure of the side walls toward each other. Instead of the narrower annular grooves shown in FIG. 2, wide annular bands or grooves 24a and 24b are provided which provide for a larger space for the collection of gas. A port 25 is provided for passage of fluid from below wall 22b to above wall 22a. Bolt aperture 26 and sealing surfacs 27b and 27a are provided for functions similar to that of FIG. 2. Ring base portion 28 and spacer block 29 are shown which function similarly to those shown in FIG. 2. Referring to FIG. 1, ring 20 is shown as installed between parts 2 and 3. Liquid fuel entering aperture 5a is under pressure and by using seal 20, leakage past the seal is obviated. Again, an aperture 51 is provided to vent any leakage of fuel past the primary surfaces.

Figure 5:
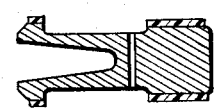
FIG. 5 is a cross-sectional view in detail of another embodiment of this invention.

FIG. 5 is similar to the structure shown in FIG. 4, but lacks a spacer portion as described with reference to FIG. 3.

Figure 6:
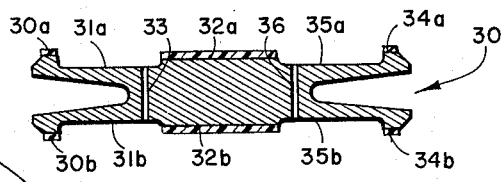
FIG. 6 is a detailed cross-sectional view of another embodiment of this invention.
Figure 8:
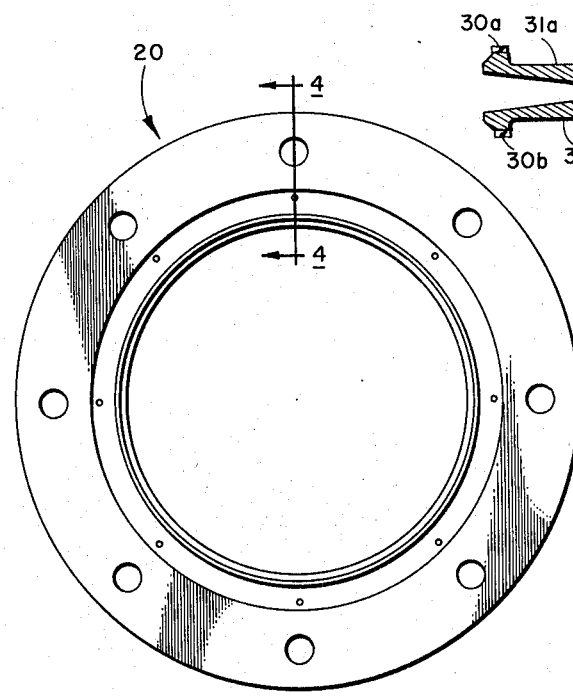
FIG. 8 is a plan view of the seal shown in FIG. 4 and typifies a plan view similar to the other embodiments.

FIG. 6 discloses still another embodiment of this invention. It performs a very important function in apparatus such as shown in FIG. 1 where fluid pressure is exerted on both sides of the seal. This seal prevents leakage between the fuel entering duct 5a and the oxidizer entering through duct 5b. Were the fuel and oxidizer to mix even in small quantities, a dangerous explosion might occur. Referring again to FIG. 6, primary sealing surfaces 30a and 30b are shown. Spring side walls 31a and 31b are similar to the embodiment shown in FIG. 4. Secondary sealing surfaces 32a and 32b are shown and passage of fluid is facilitated between one side of the seal and the other by apertures 33. On the other side of the seal is shown primary sealing surfaces 34a and 34b, spring side walls 35a and 35b along with aperture 36. Thus, it can be seen that any tendency for liquid or gas to flow past the primary sealing surfaces on either the oxidizer side or the fuel side is taken care of by providing taps or ports 37 and 38 which may duct the fluid overboard similar to the previous embodiments. There is one common secondary sealing surface 32a and 32b which prevents any tendency for liquid to escape. Again, this modification as in the others is coated with a relatively softer material or highly machined for a greater sealing capability.

Figure 7:
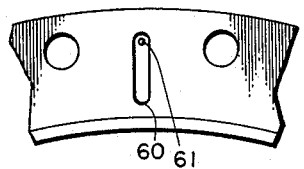

FIG. 7 discloses another embodiment of this invention. However, instead of annular grooves, radial grooves 60 are provided which allow passage of fluid to aperture 61 to the other side of the seal so as to allow a common tap-off similar to the previously described embodiments.

Thus it can be seen that the instant seal is a new and improved seal over that shown in Patent No. 3,083,023. Not only are primary and secondary sealing surfaces provided, but by use of a tap-off arrangement, leakage past the secondary seal is substantially precluded. Also, by providing the secondary seal on a rigid portion, a constant gage may be maintained between the mating parts. Also, an important feature of this invention is the relationship between the sealing pressures of the seal itself and the mating parts. In the above patent, a pre-load of the side walls is provided which is ordinarily in the neighborhood of 35 pounds per inch of circumference. At high fluid pressures such as 100 pounds, it can be seen that the fluid pressure is really the controlling factor in the seal pressure. However, in the instant structure, by providing a rigid mating part, sealing forces in the neighborhood of 200 pounds per inch of circumference is achieved. Thus, it can be seen that the 100 pounds due to fluid pressure is not as significant an item as compared with this circumferential pressure due to the mating parts.

Although not shown, it is within the scope of this invention to utilize the bolt holes as the apertures. The spacer block portion would then act as the secondary seal.

Although the invention has been described and illustrated in detail, it is to be clearly understood that the same is by way of illustration and example only and is not taken by way of limitation. The spirit and scope of this invention being limited only by the terms of the appended claims.

I claim:
1. A seal comprising:
   an annular member having a continuous ring base portion,
   a first flexible side wall integral with and extending from said ring base portion, said side wall having a first sealing surface on the outer side of said side wall and a second sealing surface on said ring base portion, a second flexible side wall integral with and extending from said ring base portion, said second side wall having a third sealing surface on the outer side of said second side wall and a fourth sealing surface on said ring portion opposite said second sealing surface, all of said sealing surfaces being of a relatively softer material than said ring portion and side walls, said side walls forming a U-shaped channel and being pressure actuatable in a direction toward the respective side wall sealing surface, annular groove means in said member on each side thereof between the sealing surfaces on said ring base portion and the sealing surfaces on said walls, and aperture means extending between the respective groove means and being located offset from the bottom of said U-shaped channel and toward said ring base portion to allow flow of fluid from between said first and second sealing surfaces to between said third and fourth sealing surfaces.

2. A seal according to claim 1 in which one surface of said ring base portion and said first side wall lie substantially in the same plane.

3. A seal according to claim 1 in which said aperture means to allow flow of fluid includes at least one substantially radially extending groove located between said first and second sealing surfaces and an aperture extending through said ring base portion.

4. A seal according to claim 1 and further including a third flexible side wall extending from said ring base portion in the opposite direction from said first side wall and having a fifth sealing surface extending about said third wall and being spaced from the plane of said third side wall and from said ring base portion, a fourth side wall extending from said ring base portion in the opposite direction from said second side wall and having a sixth sealing surface extending about said fourth side wall and being spaced from the plane of said fourth side wall and from said ring base portion and means to allow flow of fluid from between said second and fifth sealing surfaces to between said fourth and sixth sealing surfaces.

References Cited by the Examiner

UNITED STATES PATENTS

| | | | |
|---|---|---|---|
| 1,825,962 | 10/1931 | Laird | 277—180 |
| 2,532,891 | 12/1950 | Chupp | 277—180 |
| 2,913,269 | 11/1959 | Bremer et al. | 277—205 |
| 3,083,023 | 3/1963 | Creavey | 277—206 |

FOREIGN PATENTS 1,279,545   11/1961   France.

SAMUEL ROTHBERG, *Primary Examiner.*

LAVERNE D. GEIGER, E. DOWNS,
*Assistant Examiners.*